July 20, 1948.　　F. W. GODSEY, JR　　2,445,427

TORQUEMETER

Filed Oct. 29, 1943

WITNESSES:
Wm. B. Sellers.
E. F. Oberhein.

INVENTOR
Frank W. Godsey, Jr.
BY
Paul E. Friedemann
ATTORNEY

Patented July 20, 1948

2,445,427

UNITED STATES PATENT OFFICE 2,445,427

TORQUE METER

Frank W. Godsey, Jr., Forest Hills, Pa., assignor to Westinghouse Electric Corporation, East Pittsburgh, Pa., a corporation of Pennsylvania Application October 29, 1943, Serial No. 508,197

8 Claims. (Cl. 73—136)

The present invention relates to electromagnetic devices and more particularly to electromagnetic devices which produce an electrical quantity indicative of a mechanical strain.

This invention is closely related to applicant's copending applications Serial No. 455,258, filed August 18, 1942, entitled "Power measuring device for rotating shafts" and Serial No. 458,379, filed September 15, 1942, entitled "Thrust measuring devices for shafts," now Patent 2,349,663, and also to a copending application of Bernard F. Langer and the applicant, Serial No. 458,378, filed September 15, 1942, entitled "Torque measuring devices for shafts."

This invention embodies the fundamental principles disclosed in the above-mentioned copending applications and provides certain improvements which result in an increase in stability of operation and sensitivity of response to the mechanical quantity to be measured.

The teachings of the above-mentioned copending applications comprise in a broad sense the provision of an electromagnetic device for measuring an operating condition of a shaft, and to this end provide a stationary electromagnetic unit which is annular in shape and which is concentrically disposed with respect to a rotor assembly, the magnetic reluctance of which rotor assembly is variable in accordance with an elastic deflection of the shaft to which the rotor assembly is secured. The rotor assembly and the stationary electromagnetic member are magnetically coupled across air-gaps of constant magnetic characteristics, which air-gaps remain unchanged whether the rotor is rotating or stationary. Since the magnetic reluctance of the rotor member is varied in accordance with a selected elastic shaft deflection the impedance of the coil or coils on the stationary electromagnetic member is varied, the amount of the impedance change being an indication of the selected elastic shaft deflection.

Devices constructed in accordance with the teachings disclosed in the above-mentioned applications have been found to function in a highly satisfactory manner when designed with proper electromagnetic proportions. However, due to the necessity for placing such electromagnetic devices in existing apparatus where space limitations result in a poor electromagnetic design, the sensitivity and accuracy of the device to the quantity to be measured are reduced. Such poor electromagnetic proportions result in the masking of coil inductance changes due to magnetic gap changes in the rotor assembly because of excessive magnetic leakage paths, magnetic saturation, and associated losses.

The present invention discloses means whereby the effect of poor electromagnetic proportioning on the stability and sensitivity of the device are minimized.

It is a principal object of this invention to provide an electromagnetic device for measuring a mechanical strain due to a stress which is highly sensitive to the quantity to be measured and which produces an electrical quantity accurately indicative of the mechanical quantity being measured.

Another object of this invention is to provide an electromagnetic device for measuring a mechanical strain which is highly sensitive to the quantity to be measured even though the device be of poor electromagnetic design.

A further object of this invention is to provide an electromagnetic device for measuring a mechanical strain which produces an electrical quantity which is varied only in accordance with a change in the magnetic flux in the device, which change in magnetic flux is effected by the mechanical quantity to be measured.

A still further object of this invention is to provide an electromagnetic device for measuring slight mechanical displacements in which the magnetic circuit is magnetically screened and forms a well defined flux path.

A specific object of this invention is to provide a device of the character described in which the magnetic leakage paths are at a minimum.

Another specific object of the invention is to provide a device of the character described in which the effects of magnetic saturation and losses are minimized.

Other objects and advantages will become more apparent from a study of the following disclosure when considered in conjunction with the accompanying drawing, in which.

Figure 1:
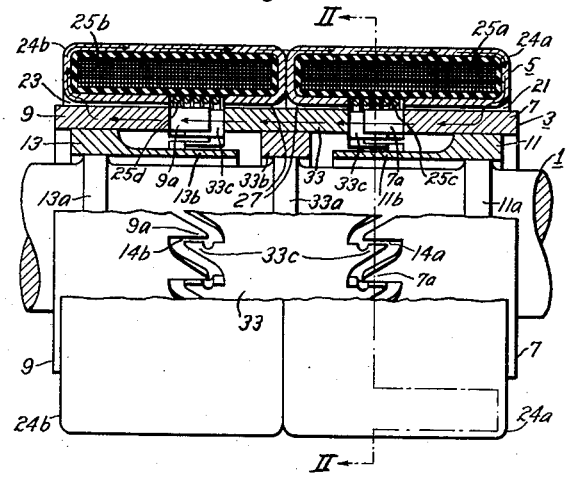
Figure 1 is a view partially in section taken longitudinally of the device constructed in accordance with the principles of this invention.

Referring now to Fig. 1 the numeral 1 designates a shaft, the torque loading of which is to be measured. Numeral 3 indicates a rotor assembly which is secured to rotate with the shaft and numeral 5 indicates an annular stationary member which is concentrically positioned about the rotor assembly 3. The rotor assembly 3 comprises a pair of axially displaced torque rings 7 and 9 having axially extending finger portions 7a and 9a. These rings are made of magnetic material and are secured to rotate with the shaft on bushings of non-magnetic material 11 and 13. As illustrated the shaft 1 is provided with flanges 11a, 13a and 33a, the bushings 11 and 13 being securely seated on the flanges 11a and 13a. Centrally disposed between the torque rings 7 and 9 is a reference ring 33 supported on the flange 33a on a non-magnetic bushing 33b. This reference ring is provided with axially extending fingers 33c which are disposed in interlocking relation with the fingers 7a and 9a of the torque rings 7 and 9 such that face portions of the fingers of the torque rings are positioned in close proximity to face portions of the fingers of the reference ring 33. This positioning of parts forms the airgaps 14a and 14b. Further, the positioning of the parts forming the airgaps 14a and 14b provides a construction which upon circumferential distortion of the shaft will increase one airgap while decreasing the other. That is, the faces of the fingers of the torque rings confronting the faces of the fingers of the reference ring lie in a single axial plane and the corresponding faces of the fingers of the reference ring lie in a single axial plane, so that upon circumferential distortion or twisting of the shaft and corresponding angular movement of the torque rings relative to the reference ring, the fingers of one torque ring move away from the cooperating fingers of the reference ring and the fingers of the other torque ring move closer to the cooperating fingers of the reference ring thus increasing one airgap while decreasing the other.

The stationary member 5 comprises the annular magnetizing coils 25a and 25b. These coils are respectively enclosed in the housings 24a and 24b of magnetic material each of which is formed about the cross-section of the coil. These coils are axially positioned with the housings thereof in abutting relationship and are concentrically disposed about the rotor assembly 3 such that constant circular airgaps 21, 23 and 27 are formed therebetween. It will be noted from Fig. 1 that the magnetic housings do not completely enclose the inner face of the coils but are each provided with an opening which is substantially equal to the space between the axial confronting space of the reference ring and the torque rings. Within each opening and in close proximity to the finger members around the periphery of the rotor assembly are positioned the coils 25c and 25d. These coils are annular in shape and completely encircle the rotor assembly in the immediate vicinity of the finger members. These coils function in effect as the secondary windings of a transformer of which the windings 25a and 25b function as the primary windings. In the positioning of these coils 25c and 25d, it is intended that they shall be linked by the magnetic airgap flux between the respective finger members, to the exclusion of the excessive magnetic leakage flux usually associated with coils 25a and 25b.

As illustrated in the drawing the non-magnetic bushings 11 and 13 supporting the torque rings 7 and 9 on the shaft are provided with coextensive portions 11b and 13b respectively which extend axially of the shaft between the shaft and the rotor assembly. The non-magnetic bushings 11 and 13, if constructed of one piece as shown, are preferably of material of high electrical conductivity. Thus the portions 11b and 13b axially extending therefrom and completely encircling the shaft form in effect a single turn short circuited conductor or winding for the rotor assembly, the function of which will become more apparent in the description of the operation of the device hereinafter provided.

The coils 25a and 25b are preferably energized from a suitable source of alternating current. Upon suitable energization of the coils, a flow of alternating magnetic flux linked with the coils 25c and 25d may be induced to flow in the stationary magnetic housings of the coils and the rotor assembly 3 in the instantaneous directions indicated by the arrows. Thus assuming a proper balance of the magnetizing forces produced by each of the coils and assuming equal magnetic characteristics of the airgaps 14a and 14b which is the condition for zero torque of the shaft, the flow of alternating magnetic flux will be around the external magnetic circuit as indicated. Assuming now that torque is being transmitted in a clockwise direction from left to right of the shaft, it will be seen that the airgaps 14b formed between the confronting faces of the torque ring 9 and the reference ring 33 will be decreased while airgaps 14a formed between the confronting faces of the torque ring 7 and the reference ring 33 will be increased thus unbalancing the normal induced magnetic flux associated with each coil and causing an unbalance magnetic flux to flow across the airgap 27 through the abutting portions of the magnetic coil housing. This unbalanced condition correspondingly results in an increase of the total magnetic flux across the airgaps 14b, while the total magnetic flux across the airgaps 14a decreases, thereby changing or unbalancing the flux linkages of the coils 25c and 25d. Since the flux linkage of the coil 25d has increased as a result of decreasing of the airgaps 14b, the voltage induced in this coil is increased in a proportional amount. As a result of the decrease in flux linkage of the coil 25c due to an increase in airgaps 14a, a drop in the voltage induced in the coil 25c occurs. There is thus obtained an unbalance of the voltages induced in these two coils and the voltage difference between the coils is indicative of the elastic deflection of the shaft as a result of torque.

Figure 5:
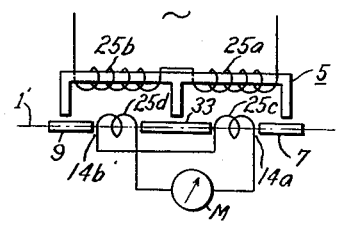
Fig. 5 is a schematic illustration disclosing the fundamental principles embodied in Fig. 1.

In order to more clearly illustrate the principles of this embodiment of the present invention the schematic equivalent of the electromagnetic circuit of Fig. 1 is illustrated in Fig. 5. In this illustration the numeral 5 represents the stationary magnetic circuit which corresponds to the coil housings. The coils 25a and 25b are illustrated as being wound about portions of this magnetic circuit corresponding to similar portions of the magnetic circuit of Fig. 1. The rotor assembly is composed of the three parts 7, 9 and 33 which correspond respectively to the two torque rings 7 and 9 and the central reference ring 33. These elements are all axially positioned on a shaft, the axis of which is indicated by the dotted line 1'. The airgaps 14a and 14b are illustrated as axial airgaps for the purpose of clearness and it must, therefore, be assumed that, for example, as the airgap 14a is decreased the airgap 14b will be increased. The coils 25c and 25d are shown disposed entirely within the airgaps 14a and 14b and are thus linked by the magnetic fields across these airgaps. The coils are connected in opposition in circuit with a meter M. From the schematic circuit of Fig. 5 it is clearly apparent that the coils 25c and 25d will respond only to changes in the density of the magnetic fields across the airgaps 14a and 14b and will, therefore, be relatively uneffected by other changes in the magnetic circuit which would tend to produce a flux change and a corresponding change in coil voltage which would not be an indication of the torque being transmitted by the shaft.

The sleeves or short circuited conductors 11b and 13b are disposed to be linked by stray magnetic fluxes which link the shaft. This, of course, assumes that the shaft is made of magnetic material. The magnetic leakage fluxes normally flowing through the shaft, link the short circuited windings and hence induce voltages therein. Since the sleeves or short circuited windings have very low electrical resistance, induced voltages and their currents result in relatively large back-magnetomotive forces which cause the flux to flow across the airgaps instead of through leakage paths. Thus the magnetic leakage flux to the shaft may be reduced substantially to zero and the magnetic fluxes induced by the magnetizing coils 25a and 25b caused to flow almost entirely in the magnetic circuit indicated.

Figure 2:
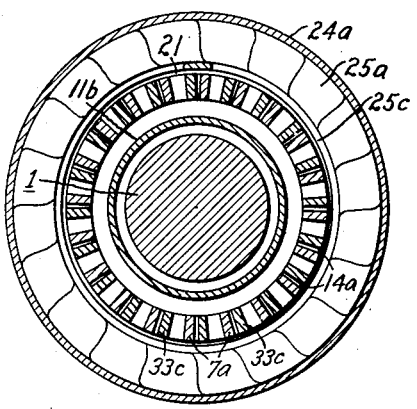
Fig. 2 is a cross-sectional view taken on the line II—II of Fig. 1.
Figure 3:
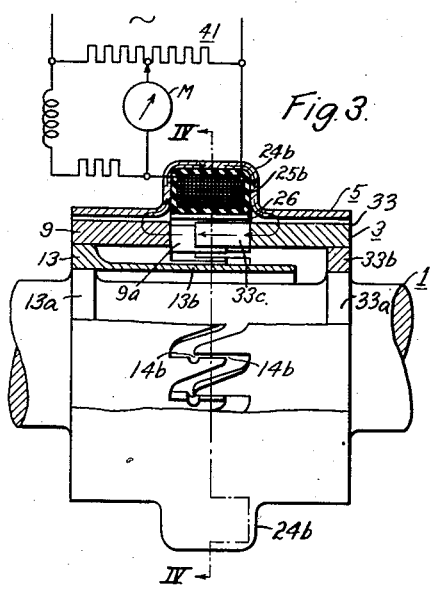
Fig. 3 is a partial sectional view illustrating a modification of this invention.
Figure 4:
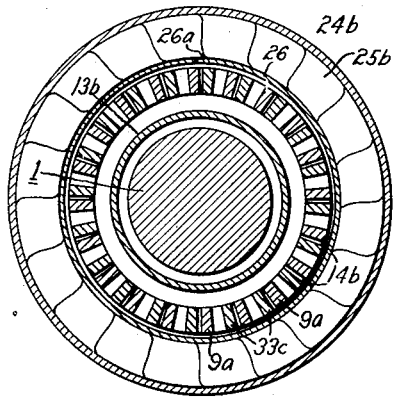
Fig. 4 is a sectional view taken on the line IV—IV of Fig. 3.

The modification of the invention illustrated in Figs. 3 and 4 is in operation or function basically the same as that of Figs. 1 and 2, only half of the device of Fig. 1, however, has been illustrated for the purpose of simplicity, since, in itself, such device is an operating unit. The differences of Fig. 3 from Fig. 1 exist entirely in the stationary member 5. The rotor assembly is mounted to the shaft in exactly the same manner as illustrated in Fig. 1 and the short circuited conductor or winding 13b remains as a part of this assembly. It will be noted that the magnetizing coil 25b has been reduced in size over that indicated in Fig. 1. The coil width now covering only the axial distance defined by the axially confronting faces of the rings 33 and 9. The coil 25b is wound about an incomplete annulus or split sleeve 26 of material of high electrical conductivity which appears in cross-section in Fig. 4. The magnetic housing 24b for the coil has been changed in configuration to conform to the coil size. Coil 25b is shown as being connected as one leg in a Wheatstone bridge circuit, the adjacent leg of which is provided with suitable values of inductance and impedance to match those of the coil. The other two legs of the bridge circuit each comprise half of the potentiometer 41. This bridge circuit may be adjusted to a balanced condition by adjustment of the potentiometer slider along the potentiometer 41. A meter M is shown connected across the output terminals of the bridge circuit. Thus for zero torque of the shaft, when the circuit is energized from a suitable source of alternating current, the bridge circuit is in a balanced condition and the meter indication is therefore zero. When the shaft is subjected to torque the magnetic characteristics of the airgaps 14b are changed, the airgaps either increasing or decreasing depending upon the direction of the torque, thus producing corresponding changes in the alternating magnetic flux circulating in the magnetic circuit and as a result an unbalanced condition of the bridge circuit is obtained. The meter therefore produces an indication which is indicative of the torque of the shaft.

As previously mentioned the ring or short circuit winding 13b is similar to that of Fig. 1 and functions to prevent or minimize a magnetic flux leakage path through the shaft 1. In an analogous manner the incomplete annulus or split ring 26 functions to keep the circulating magnetic flux as much as possible within the airgaps 14b and in this capacity forms in effect a magnetic screen which allows the airgap flux to flow, due to the presence of the break 26a, but masks out local leakage fluxes between adjacent tooth ending portion.

It is well known that a copper or other highly conducting plate placed in an alternating magnetic field has eddy currents set up in it to such a degree that their magnetic effects will partially neutralize the impressed magnetic field, and therefore, such conducting plates may be used as magnetic insulators to force alternating flux to flow in desired paths. Thus, by placing a formed plate 26 of material of high electrical conductivity near the airgaps 14b, the magnetic leakages around these airgaps are effectively screened out. The extent of the magnetic field is therefore confined almost entirely to the volume in the airgaps 14b. By reducing the coil size as indicated in Fig. 3 so that its turns are physically close to the airgaps, magnetic leakage is reduced and the impedance of the coil is changed principally only in accordance with variations in the airgap spacings of gaps 14b. Since the magnetic screening of this circuit provided by the short circuited winding 13b and the incomplete annulus or split ring 26 is such that stray magnetic fluxes are minimized, it will be seen that changes in the magnetic flux density in the magnetic circuit will be almost entirely responsive to airgap changes. Hence, the coil impedance and the coil voltage and current are accurately indicative of the desired shaft deflection.

From the foregoing it is apparent that the improvements provided by this invention measurably increase the sensitivity of the electromagnetic strain indicating device by minimizing magnetic losses. Thus even though the magnetic circuits may not be well proportioned, an accurate indication of the desired shaft condition is obtained.

The foregoing embodiment of the disclosure and the showing made in the drawing are merely illustrative of the principles of this invention and are not to be interpreted in a limiting sense. The only limitations are to be determined from the scope of the appended claims.

I claim as my invention:

1. In a device for indicating an operating characteristic of a shaft, the combination of, a primary winding, a secondary winding, a stationary magnetic housing for the windings, a rotor member of magnetic material rotated by the shaft, said rotor member having portions thereof so disposed with respect to the stationary magnetic housing that airgaps of constant magnetic characteristic are formed therebetween whether the rotor is rotating or stationary, a source of alternating current for energizing the primary winding whereby an alternating magnetic flux is produced in the stationary magnetic housing which links the rotor member across said airgaps of constant magnetic characteristic and induces a voltage in the secondary winding, a plurality of relatively displaceable magnetic elements forming a part of the rotor member responsive to an operating characteristic of the shaft for changing the value of the alternating magnetic flux, and means for measuring the voltage of the secondary winding whereby an operating characteristic of the shaft is indicated.

2. In a device for indicating an operating characteristic of a shaft, the combination of, a primary winding, a secondary winding, a stationary magnetic housing for the windings, a rotor member of magnetic material rotated by the shaft, said rotor member having portions thereof so disposed with respect to the stationary magnetic housing that airgaps of constant magnetic characteristic are formed therebetween whether the rotor is rotating or stationary, a source of alternating current for energizing the primary winding whereby an alternating magnetic flux is produced in the stationary magnetic housing which links the rotor member across said airgaps of constant magnetic characteristic and induces a voltage in the secondary winding, a plurality of relatively displaceable magnetic elements forming a part of the rotor member disposed in close proximity to the secondary winding and responsive to an operating characteristic of the shaft for changing the value of the alternating magnetic flux linking the secondary winding, and means for measuring the voltage of the secondary winding whereby an operating characteristic of the shaft is indicated.

3. In an electromagnetic device, the combination of, a stationary annular magnetizing coil, a magnetic circuit for the magnetizing coil, a rotor assembly forming a part of the magnetic circuit concentrically disposed relative to the magnetizing coil, at least two relatively displaceable elements of magnetic material forming a part of the rotor member, a single turn short circuited winding concentrically disposed with respect to and secured to rotate with the rotor assembly, and a stationary coil concentrically disposed between the magnetizing coil and the rotor assembly, in close proximity to said relatively displaceable elements of the rotor assembly.

4. In an electromagnetic device, the combination of, a stationary annular electromagnetic unit, a magnetic circuit for the electromagnetic unit, a rotor member of magnetic material concentrically disposed relative to the electromagnetic unit and forming a part of the magnetic circuit, tubular sleeve elements of non-magnetic material of high electrical conductivity concentrically disposed with respect to and secured to rotate with the rotor member, said sleeve elements forming in effect single turn short circuited windings, a plurality of relatively displaceable elements of magnetic material forming a part of the rotor member, and stationary annular coils concentrically disposed between the rotor member and the stationary annular electromagnetic unit, in close proximity to the relatively displaceable elements of the rotor member.

5. In a device for indicating an operating characteristic of a shaft, the combination of, a magnetic rotor member, means for securing the rotor member to the shaft comprising a sleeve of non-magnetic material of high electrical conductivity disposed between the rotor member and the shaft, a stationary magnetic member disposed in close proximity to the magnetic rotor member such that airgaps of constant magnetic characteristic are formed therebetween, magnetizing coil means on the stationary magnetic member for producing a magnetic flux linking both said members, relatively displaceable magnetic elements forming a part of the rotor member responsive to an operating characteristic of the shaft for altering the flux linkage of the members, said sleeve having a voltage induced therein proportional to the stray magnetic fluxes linking the shaft and producing a counter magnetomotive force in the shaft thereby minimizing the flow of magnetic fluxes in the shaft, a second coil on the stationary magnetic member positioned in close proximity to the relatively displaceable elements of the rotor member and linked only by the magnetic field adjacent said elements, said coil having a voltage induced therein proportional to the density of said magnetic field whereby an operating characteristic of the shaft is indicated.

6. In an electromagnetic device, the combination of, a stationary coil, a magnetic circuit for the coil, a rotor member forming a part of the magnetic circuit, a single turn short circuited coil for the rotor member concentrically arranged therewith, relatively displaceable magnetic elements included in the rotor member, and a stationary plate of material of high electrical conductivity formed and disposed to have a surface thereof in close proximity to said relatively displaceable elements.

7. In an electromagnetic device, the combination of, an annular stationary coil, a magnetic flux path for the coil, a rotor member concentrically disposed relative to the stationary coil and forming part of the magnetic flux path, a single turn short circuited winding concentrically disposed relative to and secured to rotate with the rotor member, at least two relatively displaceable elements of magnetic material forming a part of the rotor member, said elements upon relative displacement changing the magnetic characteristics of the magnetic circuit, and a plate of material of high electrical conductivity formed as an incomplete annulus disposed concentrically between said annular stationary coil and said rotor member and in close proximity to said relatively displaceable elements.

8. In an electromagnetic device, the combination of, a stationary member of magnetic material, a rotor member of magnetic material, a shaft mounting said rotor member, means for producing an alternating magnetic flux linking both said members, a single turn annular short circuited winding concentrically disposed between the rotor member and the shaft and rotatable with the rotor member, said winding being linked by the magnetic field adjacent the rotor member in said shaft thereby producing a magnetic field in opposition to the magnetic field in said shaft, a plurality of relatively displaceable elements of magnetic material forming magnetic airgaps therebetween, included as a part of the rotor member, which when relatively displaced alter the magnetic flux linkage of said members, and a plate of material of high electrical conductivity supported by said stationary member and formed and disposed to have a surface thereof in close proximity to said relatively displaceable elements whereby said plate is linked by the magnetic field adjacent said airgaps and produces a magnetomotive force in opposition to the airgap magnetic field.

FRANK W. GODSEY, JR.

REFERENCES CITED

The following references are of record in the file of this patent:

UNITED STATES PATENTS

| Number | Name | Date |
|---|---|---|
| 979,503 | Johnson | Dec. 27, 1910 |
| 1,897,415 | Barbour | Feb. 14, 1933 |
| 2,318,271 | Weiche | May 4, 1933 |
| 2,349,653 | Godsey | May 23, 1944 |
| 2,354,129 | Langer | July 18, 1944 |
| 2,354,130 | Langer et al. | July 18, 1944 |

FOREIGN PATENTS

| Number | Country | Date |
|---|---|---|
| 57,054 | Norway | Sept. 28, 1936 |
| 442,441 | Great Britain | Feb. 3, 1936 |
| 527,835 | France | Aug. 3, 1921 |